US011627432B2

(12) United States Patent
Zadehdarrehshoorian et al.

(10) Patent No.: US 11,627,432 B2
(45) Date of Patent: Apr. 11, 2023

(54) METHOD AND APPARATUS FOR IMPROVING POSITIONING PERFORMANCE BY ANALYZING SIGNALS TRANSMITTED VIA DIFFERENT SUB-CHANNELS

(71) Applicant: HERE GLOBAL B.V., Eindhoven (NL)

(72) Inventors: Maral Zadehdarrehshoorian, Tampere (FI); Muhammad Irshan Khan, Tampere (FI); Jukka Talvitie, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/398,873

(22) Filed: Aug. 10, 2021

(65) Prior Publication Data
US 2023/0047200 A1 Feb. 16, 2023

(51) Int. Cl.
*H04W 4/02* (2018.01)
*H04B 17/336* (2015.01)
(Continued)

(52) U.S. Cl.
CPC .......... *H04W 4/023* (2013.01); *H04B 17/336* (2015.01); *H04B 17/382* (2015.01);
(Continued)

(58) Field of Classification Search
CPC ... H04W 4/023; H04W 4/029; H04W 64/003; H04B 17/336; H04B 17/382; H04L 5/0046
See application file for complete search history.

(56) References Cited

U.S. PATENT DOCUMENTS 11,363,518 B2 * 6/2022 Patil ..................... H04W 48/12
2014/0135042 A1 5/2014 Buchheim et al.

FOREIGN PATENT DOCUMENTS

WO WO 2019/138130 A1 7/2019

OTHER PUBLICATIONS

Huang et al., "A Robust Indoor Positioning Method based on Bluetooth Low Energy with Separate Channel Information", Sensors 2019, 19(16), (Aug. 9, 2019), 19 pages.
(Continued)

*Primary Examiner* — Kabir A Timory
(74) *Attorney, Agent, or Firm* — Alston & Bird LLP

(57) ABSTRACT

A method, apparatus and computer program product are provided to improve the positioning performance of a positioning application. The method receives particular radio signal propagation information regarding received radio signal propagation parameter of a respective signal collected by a mobile device following transmission by a beacon on a sub-channel. The method also receives past radio signal propagation information regarding the received radio signal propagation parameter of signals previously transmitted by the beacon and collected by the mobile device on one or more sub-channels. Based on the particular radio signal propagation information and the past radio signal propagation information, the method determines a value for representing the respective signal that is different from the received radio signal propagation parameter of the respective signal. The method represents the respective signal with the value determined based on the particular radio signal propagation information and the past radio signal propagation information.

20 Claims, 10 Drawing Sheets

(51) Int. Cl.
*H04W 64/00* (2009.01)
*H04B 17/382* (2015.01)
*H04W 4/029* (2018.01)
*H04L 5/00* (2006.01)

(52) U.S. Cl.
CPC .......... *H04L 5/0046* (2013.01); *H04W 4/029* (2018.02); *H04W 64/003* (2013.01)

(56) References Cited

OTHER PUBLICATIONS

Ishida et al., "Proposal of Separate Channel Fingerprinting using Bluetooth Low Energy", 2016 5th IIAI International Congress on Advanced Applied Informatics (IIAI-AAI), (Jul. 10-14, 2016), 4 pages.

Zhuang et al., "Smartphone-Based Indoor Localization with Bluetooth Low Energy Beacons", Sensors 2016, 16(5), (Apr. 26, 2016), 20 pages.

\* cited by examiner

METHOD AND APPARATUS FOR IMPROVING POSITIONING PERFORMANCE BY ANALYZING SIGNALS TRANSMITTED VIA DIFFERENT SUB-CHANNELS

TECHNOLOGICAL FIELD

An example embodiment relates generally to the determination of the position of a mobile device and, more particularly, to the determination of the position of a mobile device based upon signals transmitted by a beacon via a plurality of sub-channels.

BACKGROUND

A variety of positioning applications are employed by navigation systems, mapping services or the like. Some positioning applications rely upon fingerprint information to determine the position of a mobile device. The fingerprint information is based on previously collected signals that have been transmitted by one or more beacons throughout a space. The fingerprint information defines the signal strength expectation at each of a plurality of locations throughout the space. The positioning applications that rely upon fingerprint information generally compare signal strength information relating to signals collected by a mobile device to the fingerprint information that has been previously defined throughout the space to determine the location at which the fingerprint information most closely matches the signal strength information. This location at which the fingerprint information most closely matches the signal strength information of the signals collected by the mobile device is determined to be the position of the mobile device.

The signals that are transmitted throughout a space and utilized for positioning purposes may be provided by a beacon. Some beacons, such as beacons that transmit Bluetooth Low Energy (BLE) signals, transmit signals via a plurality of sub-channels, each of which has a different frequency. Positioning applications have not generally distinguished between the sub-channels via which signals are transmitted by a beacon, but have, instead, considered the signals transmitted via different sub-channels in the aggregate. The transmission of signals by a beacon via a plurality of sub-channels may therefore increase the error in the position of a mobile device as determined by a positioning application. In this regard, the signals collected by a mobile device at the same location, but transmitted by the beacon via different sub-channels, may have different signal strengths. During the determination of the position of a mobile device, the signal strength of the signals collected by the mobile device at a single location may therefore vary depending upon the sub-channel via which the signals were transmitted, thereby potentially leading to the determination that the mobile device is in different positions and potentially causing the position of the mobile device to appear to jump depending upon the sub-channel via which the signals were transmitted. Additionally, errors in positioning may arise in an instance in which the fingerprint information is based upon signals transmitted by the beacon via one sub-channel, but a positioning application subsequently determines the position of the mobile device based upon the signals transmitted by the beacon via a different sub-channel.

BRIEF SUMMARY

A method, apparatus and computer program product are provided in accordance with an example embodiment in order to improve the positioning performance associated with a positioning application. In this regard, the method, apparatus and computer program product are configured to determine the position of a mobile device based not only upon radio signal propagation information regarding a respective signal that has been collected by a mobile device, but also past radio signal propagation information that takes into account the sub-channel via which the signals have been transmitted. As a result, the position of the mobile device may be determined with improved accuracy and may reduce the instances in which the position of the mobile device may appear to jump from one location to another due to the evaluation of signals transmitted by a beacon via different sub-channels. In another example embodiment, a method, apparatus and computer program product are provided for discriminating between signals transmitted on a plurality of sub-channels in conjunction with a positioning application. In this regard, radio signal propagation information regarding signals collected by a mobile device may be separately classified based on the sub-channel on which a respective signal was transmitted, thereby allowing for improved positioning performance of the positioning application by reference to different representations of the received radio signal propagation parameter depending upon the sub-channel via which the signals were transmitted.

In an example embodiment, a method is provided for improving positioning performance associated with a positioning application. The method includes receiving particular radio signal propagation information regarding a received radio signal propagation parameter of a respective signal collected by a mobile device following transmission by a beacon on one of a plurality of sub-channels. The method also includes receiving past radio signal propagation information regarding the received radio signal propagation parameter of signals previously transmitted by the beacon and collected by the mobile device on one or more of the plurality of sub-channels. Based on the particular radio signal propagation information and the past radio signal propagation information, the method further includes determining, by processing circuitry, a value for representing the respective signal that is different from the received radio signal propagation parameter of the respective signal. The method additionally includes representing, by the processing circuitry in conjunction with the positioning application, the respective signal with the value determined based on the particular radio signal propagation information and the past radio signal propagation information.

The method of an example embodiment also includes determining a position of the mobile device based upon a comparison of the value representative of the respective signal to information regarding a received radio signal propagation expectation that is anticipated to be received from the beacon at each of a plurality of locations. In an example embodiment, the method also includes determining the sub-channel on which the respective signal was transmitted and classifying the particular radio signal propagation information regarding the received radio signal propagation parameter of the respective signal based on the sub-channel on which the respective signal was transmitted.

The method of an example embodiment represents the respective signal with the value by representing the respective signal with a mean of at least some of the signals that have been previously transmitted by the beacon and collected by the mobile device on the same sub-channel as the sub-channel on which the respective signal was transmitted. In another example embodiment, the method represents the respective signal with the value by representing the respective signal based upon a combination of the received radio signal propagation parameter of the respective signal and a representation of the received radio signal propagation parameter of at least some of the signals that have been previously transmitted by the beacon and collected by the mobile device on one or more of the other sub-channels, different than the sub-channel on which the respective signal was transmitted. In this regard, the method may represent the respective signal based upon the combination of the received radio signal propagation parameter of the respective signal and a mean of the received radio signal propagation parameter of at least some of the signals that have been previously transmitted by the beacon and collected by the mobile device on one or more of the other sub-channels, different than the sub-channel on which the respective signal was transmitted. Alternatively, the method may represent the respective signal based upon the combination by predicting an anticipated value of the received radio signal propagation parameter of a signal that would have been: (i) transmitted by the beacon on another sub-channel, different than the sub-channel on which the respective signal was transmitted and (ii) collected by the mobile device contemporaneously with collection by the mobile device of the respective signal and then representing the respective signal based upon the combination of the received radio signal propagation parameter of the respective signal and the anticipated value. In another example embodiment, the method may represent the respective signal based upon the combination of the received radio signal propagation parameter of the respective signal and the received radio signal propagation parameters of signals that have been previously transmitted by the beacon and collected by the mobile device on one or more of the other sub-channels, different than the sub-channel on which the respective signal was transmitted, most recently relative to a time at which the respective signal was collected by the mobile device.

In another example embodiment, an apparatus is provided that is configured to improve positioning performance associated with a positioning application. The apparatus includes processing circuitry and at least one memory including computer program code instructions with the computer program code instructions configured to, when executed by the processing circuitry, cause the apparatus to receive particular radio signal propagation information regarding a received radio signal propagation parameter of a respective signal collected by a mobile device following transmission by a beacon on one of a plurality of sub-channels. The computer program code instructions are also configured to, when executed by the processing circuitry, cause the apparatus to receive past radio signal propagation information regarding the received radio signal propagation parameter of signals previously transmitted by the beacon and collected by the mobile device on one or more of the plurality of sub-channels and, based on the particular radio signal propagation information and the past radio signal propagation information, to determine a value for representing the respective signal that is different from the received radio signal propagation parameter of the respective signal. The computer program code instructions are further configured to, when executed by the processing circuitry, cause the apparatus to represent, in conjunction with the positioning application, the respective signal with the value determined based on the particular radio signal propagation information and the past radio signal propagation information.

The computer program code instructions are further configured to, when executed by the processing circuitry, cause the apparatus of an example embodiment to determine a position of the mobile device based upon a comparison of the value representative of the respective signal to information regarding a received radio signal propagation expectation that is anticipated to be received from the beacon at each of a plurality of locations. In an example embodiment, the computer program code instructions are further configured to, when executed by the processing circuitry, cause the apparatus to determine the sub-channel on which the respective signal was transmitted and to classify the particular radio signal propagation information regarding the received radio signal propagation parameter of the respective signal based on the sub-channel on which the respective signal was transmitted. The computer program code instructions are configured to, when executed by the processing circuitry, cause the apparatus of an example embodiment to represent the respective signal with the value by representing the respective signal with a mean of at least some of the signals that have been previously transmitted by the beacon and collected by the mobile device on the same sub-channel as the sub-channel on which the respective signal was transmitted.

The computer program code instructions are configured to, when executed by the processing circuitry, cause the apparatus of an example embodiment to represent the respective signal with the value by representing the respective signal based upon a combination of the received radio signal propagation parameter of the respective signal and a representation of the received radio signal propagation parameter of at least some of the signals that have been previously transmitted by the beacon and collected by the mobile device on one or more of the other sub-channels, different than the sub-channel on which the respective signal was transmitted. In this regard, the computer program code instructions may be configured to, when executed by the processing circuitry, cause the apparatus to represent the respective signal based upon the combination of the received radio signal propagation parameter of the respective signal and a mean of the received radio signal propagation parameter of at least some of the signals that have been previously transmitted by the beacon and collected by the mobile device on one or more of the other sub-channels, different than the sub-channel on which the respective signal was transmitted. Alternatively, the computer program code instructions may be configured to, when executed by the processing circuitry, cause the apparatus to represent the respective signal based upon the combination by predicting a predicted value of the received radio signal propagation parameter of a signal that would have been: (i) transmitted by the beacon on another sub-channel, different than the sub-channel on which the respective signal was transmitted and (ii) collected by the mobile device contemporaneously with collection by the mobile device of the respective signal and by representing the respective signal based upon the combination of the received radio signal propagation parameter of the respective signal and the predicted value. In another example embodiment, the computer program code instructions may be configured to, when executed by the processing circuitry, cause the apparatus to represent the respective signal based upon the combination of the received radio signal propagation parameter of the respective signal and the received radio signal propagation parameter of signals that have been previously transmitted by the beacon and collected by the mobile device on one or more of the other sub-channels, different than the sub-channel on which the respective signal was transmitted, most recently relative to a time at which the respective signal was collected by the mobile device.

In a further example embodiment, a computer program product is provided that is configured to improve positioning performance associated with a positioning application. The computer program product includes a non-transitory computer readable storage medium having program code portions stored thereon with the program code portions configured, upon execution, to receive particular radio signal propagation information regarding a received radio signal propagation parameter of a respective signal collected by a mobile device following transmission by a beacon on one of a plurality of sub-channels. The program code portions are also configured to receive past radio signal propagation information regarding the received radio signal propagation parameter of signals previously transmitted by the beacon and collected by the mobile device on one or more of the plurality of sub-channels. Based on the particular radio signal propagation information and the past radio signal propagation information, the program code portions are further configured to determine a value for representing the respective signal that is different from the received radio signal propagation parameter of the respective signal and to represent, in conjunction with the positioning application, the respective signal with the value determined based on the particular radio signal propagation information and the past radio signal propagation information.

The program code portions of an example embodiment are also configured to determine a position of the mobile device based upon a comparison of the value representative of the respective signal to information regarding a received radio signal propagation expectation that is anticipated to be received from the beacon at each of a plurality of locations. In an example embodiment, the program code portions are also configured to determine the sub-channel on which the respective signal was transmitted and to classify the particular radio signal propagation information regarding the received radio signal propagation parameter of the respective signal based on the sub-channel on which the respective signal was transmitted.

The program code portions that are configured to represent the respective signal with the value include, in an example embodiment, program code portions configured to represent the respective signal with a mean of at least some of the signals that have been previously transmitted by the beacon and collected by the mobile device on the same sub-channel as the sub-channel on which the respective signal was transmitted. In another example embodiment, the program code portions that are configured to represent the respective signal with the value include program code portions configured to represent the respective signal based upon a combination of the received radio signal propagation parameter of the respective signal and a representation of the received radio signal propagation parameter of at least some of the signals that have been previously transmitted by the beacon and collected by the mobile device on one or more of the other sub-channels, different than the sub-channel on which the respective signal was transmitted. In this regard, the program code portions of an example embodiment are configured to represent the respective signal based upon the combination of the received radio signal propagation parameter of the respective signal and a mean of the received radio signal propagation parameter of at least some of the signals that have been previously transmitted by the beacon and collected by the mobile device on one or more of the other sub-channels, different than the sub-channel on which the respective signal was transmitted. Alternatively, the program code portions that are configured to represent the respective signal based upon the combination include program code portions configured to predict an anticipated value of the received radio signal propagation parameter of a signal that would have been: (i) transmitted by the beacon on another sub-channel, different than the sub-channel on which the respective signal was transmitted and (ii) collected by the mobile device contemporaneously with collection by the mobile device of the respective signal and program code portions configured to represent the respective signal based upon the combination of the received radio signal propagation parameter of the respective signal and the anticipated value. In another example embodiment, the program code portions are configured to represent the respective signal based upon the combination of the received radio signal propagation parameter of the respective signal and the received radio signal propagation parameter of signals that have been previously transmitted by the beacon and collected by the mobile device on one or more of the other sub-channels, different than the sub-channel on which the respective signal was transmitted, most recently relative to a time at which the respective signal was collected by the mobile device.

In yet another example embodiment, an apparatus is provided for improving positioning performance associated with a positioning application. The apparatus includes means for receiving particular radio signal propagation information regarding a received radio signal propagation parameter of a respective signal collected by a mobile device following transmission by a beacon on one of a plurality of sub-channels. The apparatus also includes means for receiving past radio signal propagation information regarding the received radio signal propagation parameter of signals previously transmitted by the beacon and collected by the mobile device on one or more of the plurality of sub-channels. Based on the particular radio signal propagation information and the past radio signal propagation information, the apparatus further includes means for determining a value for representing the respective signal that is different from the received radio signal propagation parameter of the respective signal and means for representing, in conjunction with the positioning application, the respective signal with the value determined based on the particular radio signal propagation information and the past radio signal propagation information.

The apparatus of an example embodiment also includes means for determining a position of the mobile device based upon a comparison of the value representative of the respective signal to information regarding a received radio signal propagation expectation that is anticipated to be received from the beacon at each of a plurality of locations. In an example embodiment, the apparatus also includes means for determining the sub-channel on which the respective signal was transmitted and means for classifying the particular radio signal propagation information regarding the received radio signal propagation parameter of the respective signal based on the sub-channel on which the respective signal was transmitted.

The means for representing the respective signal with the value in accordance with an example embodiment includes means for representing the respective signal with a mean of at least some of the signals that have been previously transmitted by the beacon and collected by the mobile device on the same sub-channel as the sub-channel on which the respective signal was transmitted. In another example embodiment, the means for representing the respective signal with the value includes means for representing the respective signal based upon a combination of the received radio signal propagation parameter of the respective signal and a representation of the received radio signal propagation parameter of at least some of the signals that have been previously transmitted by the beacon and collected by the mobile device on one or more of the other sub-channels, different than the sub-channel on which the respective signal was transmitted. In this regard, the respective signal may be represented based upon the combination of the received radio signal propagation parameter of the respective signal and a mean of the received radio signal propagation parameter of at least some of the signals that have been previously transmitted by the beacon and collected by the mobile device on one or more of the other sub-channels, different than the sub-channel on which the respective signal was transmitted. Alternatively, the means for representing the respective signal based upon the combination includes means for predicting an anticipated value of the received radio signal propagation parameter of a signal that would have been: (i) transmitted by the beacon on another sub-channel, different than the sub-channel on which the respective signal was transmitted and (ii) collected by the mobile device contemporaneously with collection by the mobile device of the respective signal and means for representing the respective signal based upon the combination of the received radio signal propagation parameter of the respective signal and the anticipated value. In another example embodiment, the respective signal may be represented based upon the combination of the received radio signal propagation parameter of the respective signal and the received radio signal propagation parameter of signals that have been previously transmitted by the beacon and collected by the mobile device on one or more of the other sub-channels, different than the sub-channel on which the respective signal was transmitted, most recently relative to a time at which the respective signal was collected by the mobile device.

In an example embodiment, a method is provided for discriminating between signals transmitted on a plurality of sub-channels in conjunction with a positioning application. The method includes receiving radio signal propagation information regarding a received radio signal propagation parameter of signals collected by a mobile device following transmission by a beacon on the plurality of sub-channels. The method also includes classifying, with processing circuitry, the radio signal propagation information regarding the received radio signal propagation parameter of the signals based on the sub-channel on which a signal was transmitted. In conjunction with the positioning application and separately for each of the plurality of sub-channels, the method further includes defining, with the processing circuitry, a representation of the received radio signal propagation parameter of the signals transmitted by the beacon on a respective sub-channel based on classification of the radio signal propagation information in relation to the respective sub-channel.

The method of an example embodiment further includes associating the representation of the received radio signal propagation parameter of the signals transmitted by the beacon on the respective sub-channel with an indication of the respective sub-channel of the beacon. In an embodiment in which the beacon is associated with an address, the method further includes creating one or more virtual addresses based upon the address and associated with respective sub-channels of the beacon. In an example embodiment, the method classifies the radio signal propagation information regarding the received radio signal propagation parameter of the signals by classifying the radio signal propagation information regarding the received radio signal propagation parameter of a batch of the signals that have been transmitted by the beacon and collected by the mobile device over time.

In another example embodiment, an apparatus is provided that is configured to discriminate between signals transmitted on a plurality of sub-channels in conjunction with a positioning application. The apparatus includes processing circuitry and at least one memory including computer program code instructions with the computer program code instructions configured to, when executed by the processing circuitry, cause the apparatus to receive radio signal propagation information regarding a received radio signal propagation parameter of signals collected by a mobile device following transmission by a beacon on the plurality of sub-channels. The computer program code instructions are also configured to, when executed by the processing circuitry, cause the apparatus to classify the radio signal propagation information regarding the received radio signal propagation parameter of the signals based on the sub-channel on which a signal was transmitted. In conjunction with the positioning application and separately for each of the plurality of sub-channels, the computer program code instructions are further configured to, when executed by the processing circuitry, cause the apparatus to define a representation of the received radio signal propagation parameter of the signals transmitted by the beacon on a respective sub-channel based on classification of the radio signal propagation information in relation to the respective sub-channel.

The computer program code instructions are also configured to, when executed by the processing circuitry, cause the apparatus of an example embodiment to associate the representation of the received radio signal propagation parameter of the signals transmitted by the beacon on the respective sub-channel with an indication of the respective sub-channel of the beacon. In an embodiment in which the beacon is associated with an address, the computer program code instructions are further configured to, when executed by the processing circuitry, cause the apparatus to create one or more virtual addresses based upon the address and associated with respective sub-channels of the beacon. In an example embodiment, the computer program code instructions are configured to, when executed by the processing circuitry, cause the apparatus to classify the radio signal propagation information regarding the received radio signal propagation parameter of the signals by classifying the radio signal propagation information regarding the received radio signal propagation parameter of a batch of the signals that have been transmitted by the beacon and collected by the mobile device over time.

In a further example embodiment, a computer program product is provided that is configured to discriminate between signals transmitted on a plurality of sub-channels in conjunction with a positioning application. The computer program product includes a non-transitory computer readable storage medium having program code portions stored thereon with the program code portions configured, upon execution, to receive radio signal propagation information regarding a received radio signal propagation parameter of signals collected by a mobile device following transmission by a beacon on the plurality of sub-channels. The program code portions are also configured to classify the radio signal propagation information regarding the received radio signal propagation parameter of the signals based on the sub-channel on which a signal was transmitted. In conjunction with the positioning application and separately for each of the plurality of sub-channels, the program code portions are further configured to define a representation of the received radio signal propagation parameter of the signals transmitted by the beacon on a respective sub-channel based on classification of the radio signal propagation information in relation to the respective sub-channel.

The program code portions of an example embodiment are further configured to associate the representation of the received radio signal propagation parameter of the signals transmitted by the beacon on the respective sub-channel with an indication of the respective sub-channel of the beacon. In an embodiment in which the beacon is associated with an address, the program code portions are further configured to create one or more virtual addresses based upon the address and associated with respective sub-channels of the beacon. In an example embodiment, the program code portions configured to classify the radio signal propagation information regarding the received radio signal propagation parameter of the signals include program code portions configured to classify the radio signal propagation information regarding the received radio signal propagation parameter of a batch of the signals that have been transmitted by the beacon and collected by the mobile device over time.

In yet another example embodiment, an apparatus is provided that is configured to discriminate between signals transmitted on a plurality of sub-channels in conjunction with a positioning application. The apparatus includes means for receiving radio signal propagation information regarding a received radio signal propagation parameter of signals collected by a mobile device following transmission by a beacon on the plurality of sub-channels. The apparatus also includes means for classifying the radio signal propagation information regarding the received radio signal propagation parameter of the signals based on the sub-channel on which a signal was transmitted. In conjunction with the positioning application and separately for each of the plurality of sub-channels, the apparatus further includes means for defining a representation of the received radio signal propagation parameter of the signals transmitted by the beacon on a respective sub-channel based on classification of the radio signal propagation information in relation to the respective sub-channel.

The apparatus of an example embodiment further includes means for associating the representation of the received radio signal propagation parameter of the signals transmitted by the beacon on the respective sub-channel with an indication of the respective sub-channel of the beacon. In an embodiment in which the beacon is associated with an address, the apparatus further includes means for creating one or more virtual addresses based upon the address and associated with respective sub-channels of the beacon. In an example embodiment, the means for classifying the radio signal propagation information regarding the received radio signal propagation parameter of the signals includes means for classifying the radio signal propagation information regarding the received radio signal propagation parameter of a batch of the signals that have been transmitted by the beacon and collected by the mobile device over time.

BRIEF DESCRIPTION OF THE DRAWINGS

Figure 1:
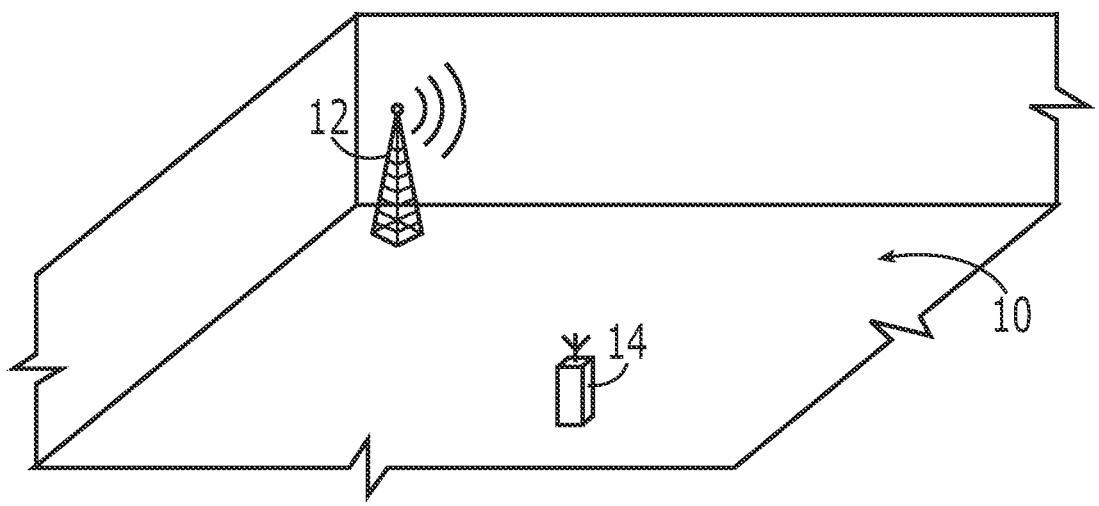
Figure 2:
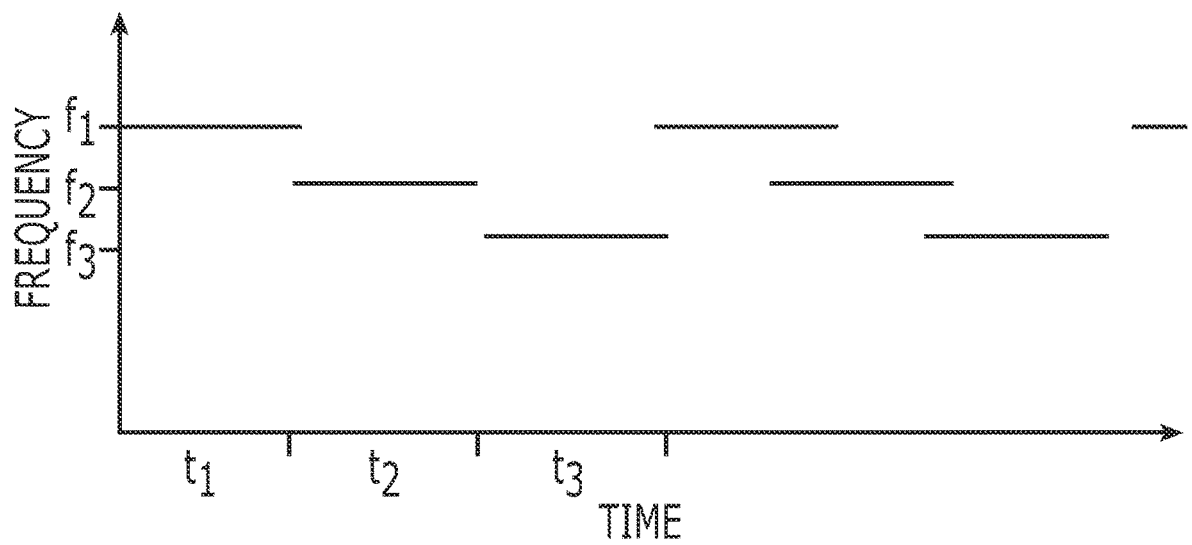
Figure 3:
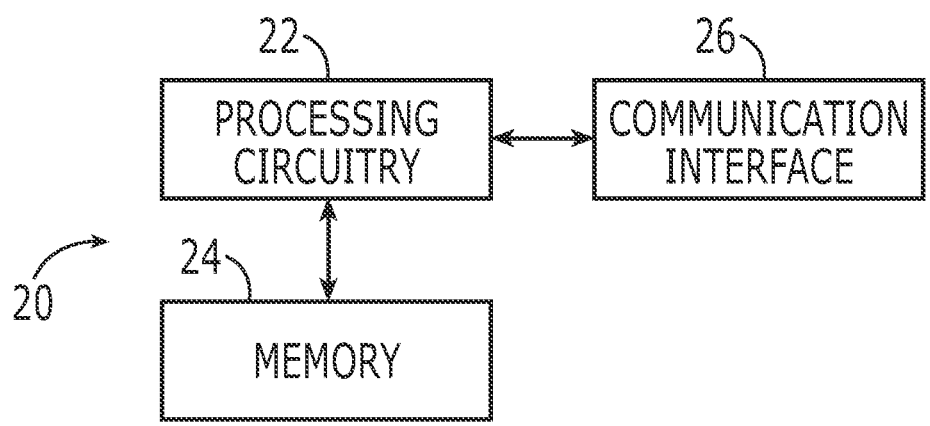
Figure 4:
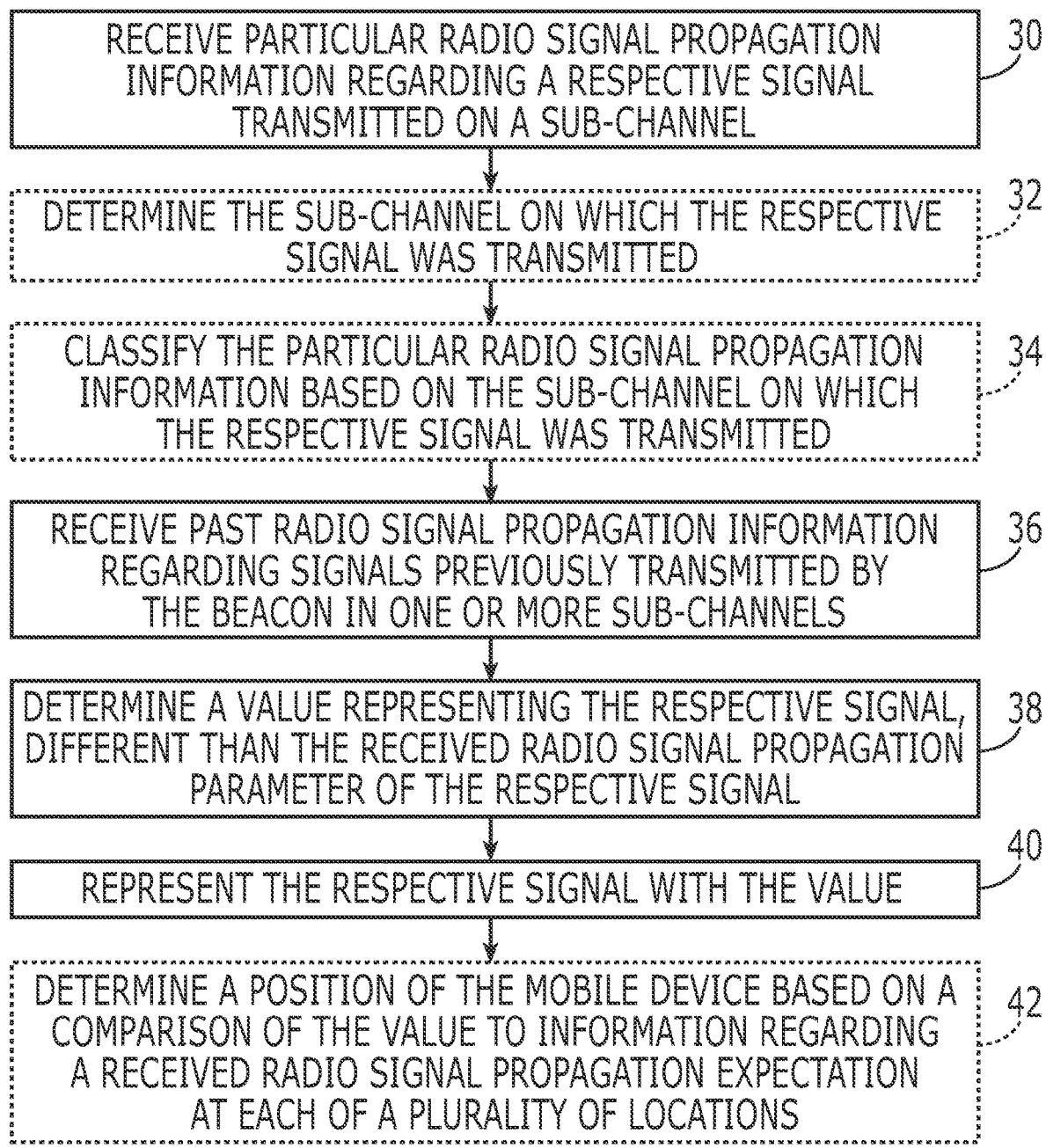
Figure 5:
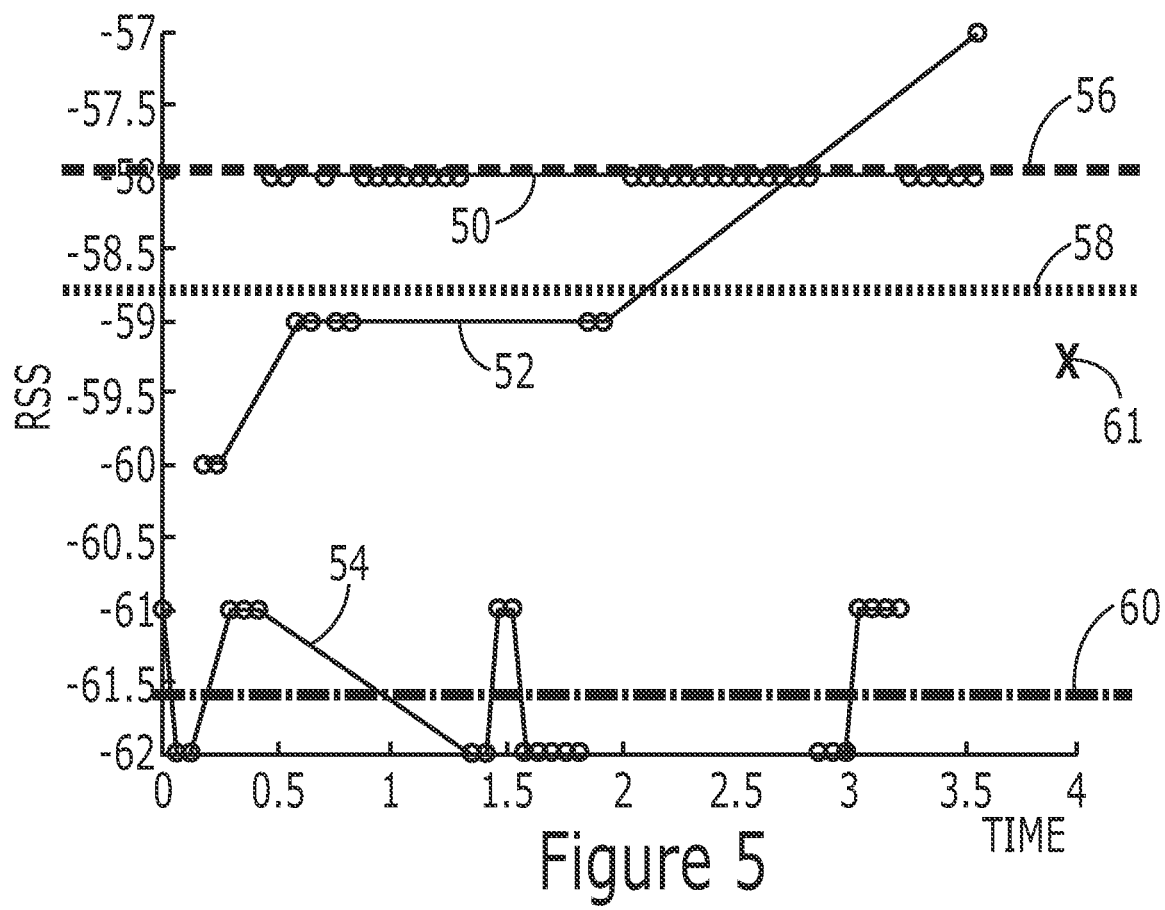
Figure 6:
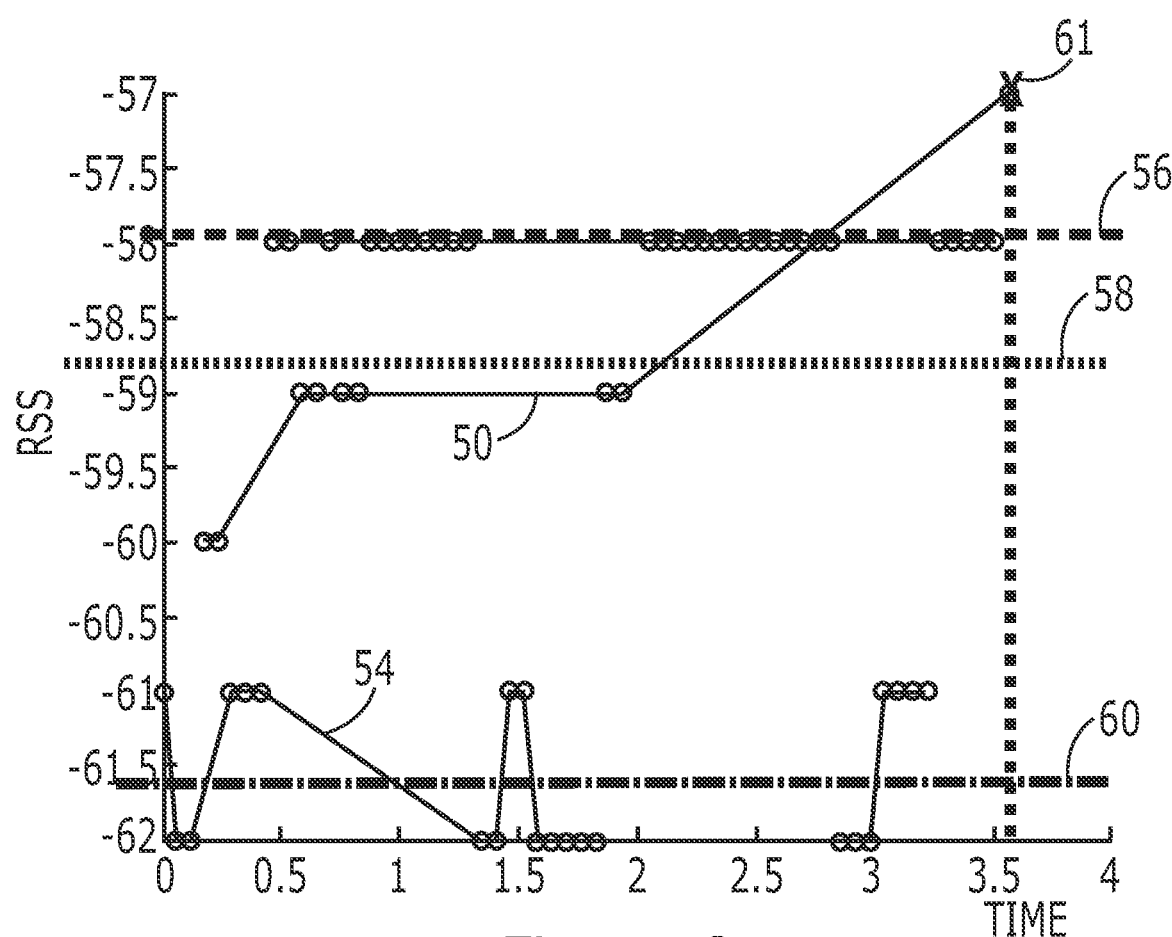
Figure 7:
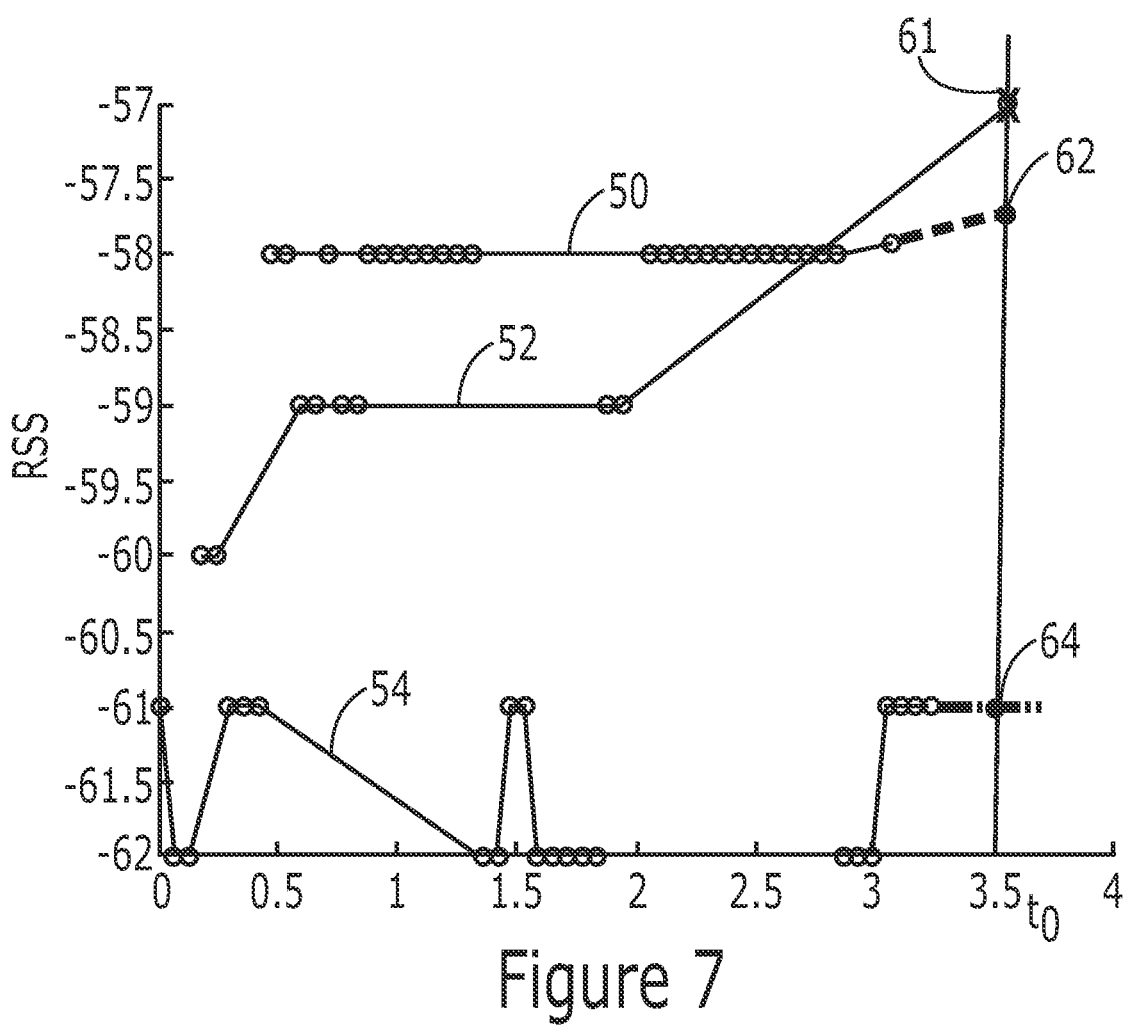
Figure 8:
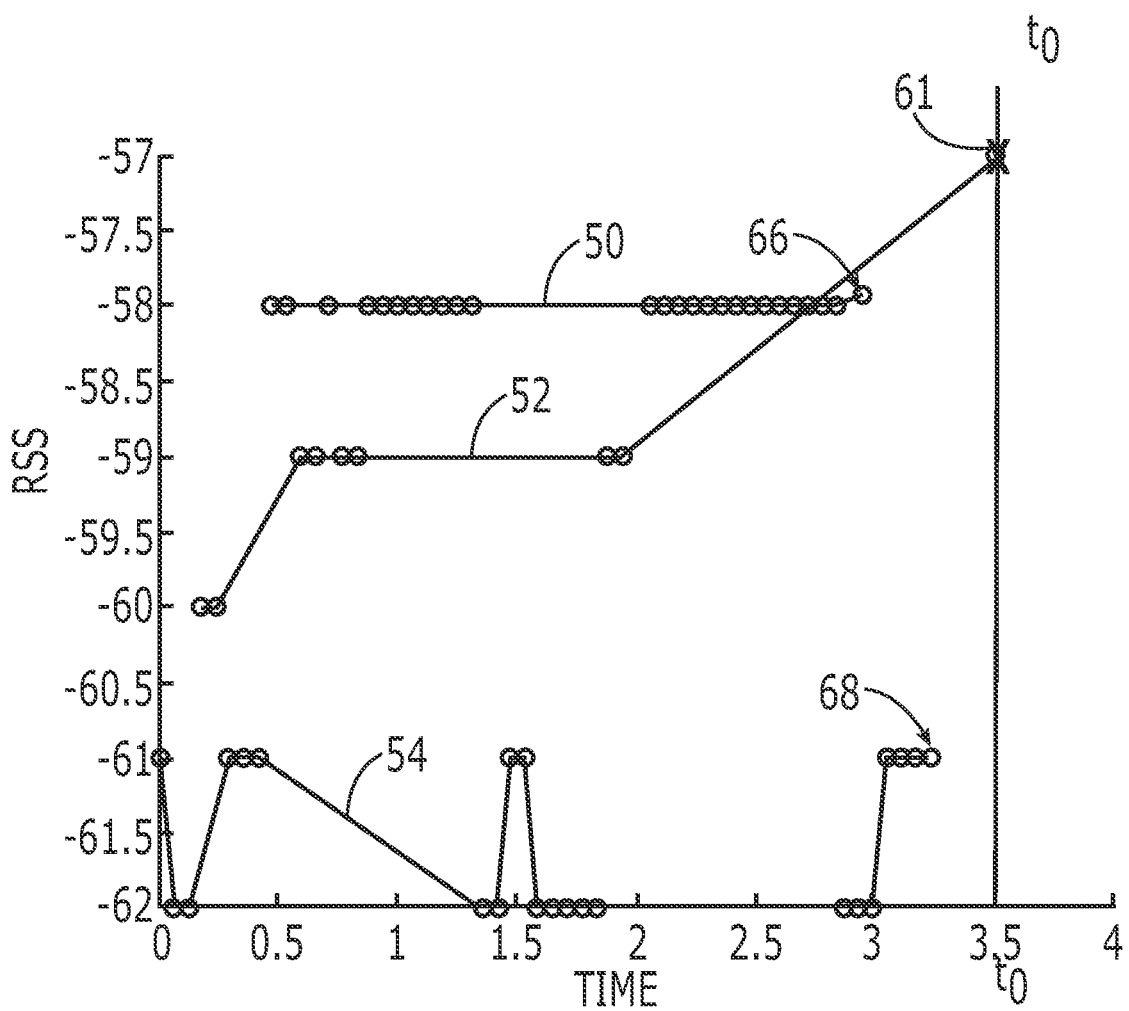
Figure 9:
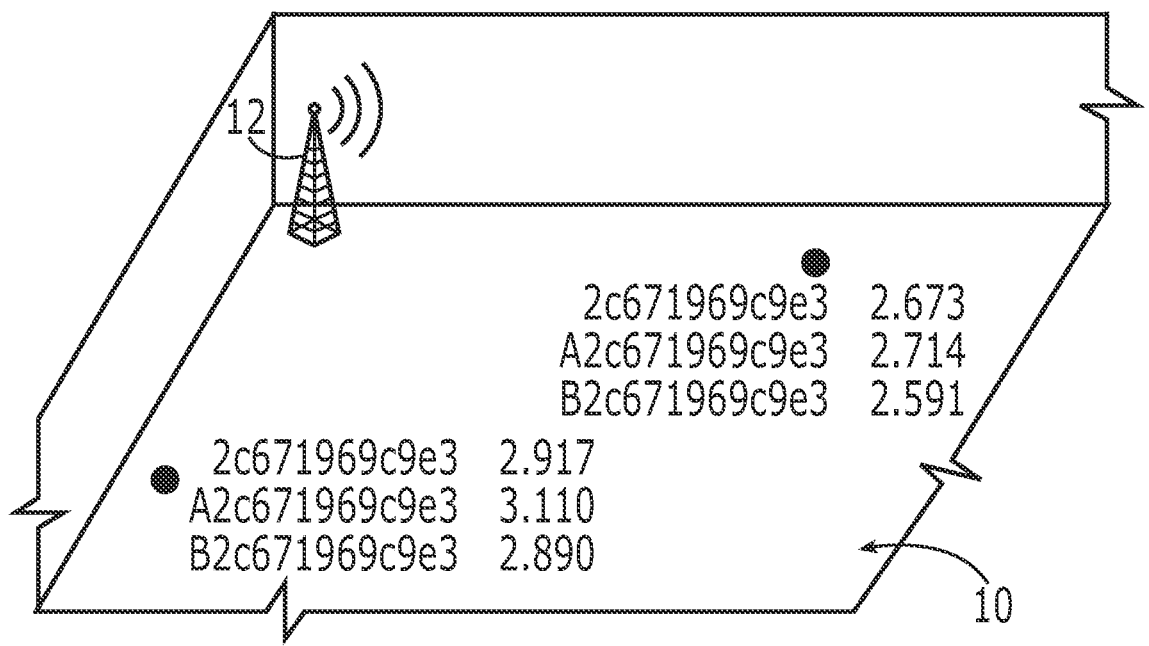
Figure 10:
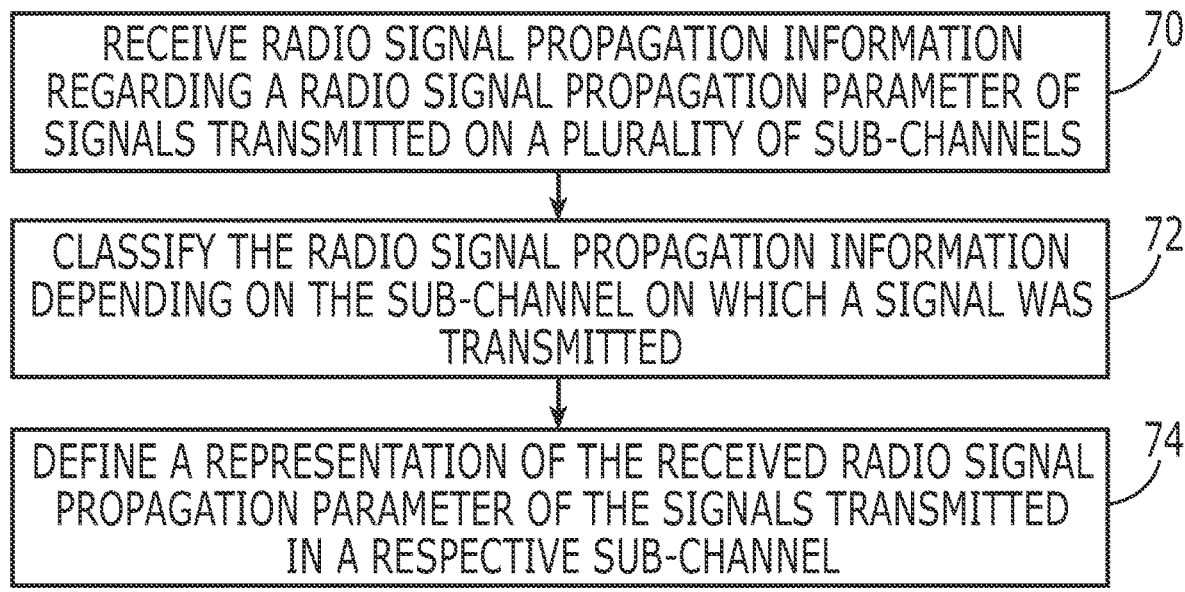

Having thus described example embodiments of the present disclosure in general terms, reference will now be made to the accompanying drawings, which are not necessarily drawn to scale, and wherein:

FIG. 1 illustrates one example of a space throughout which signals transmitted by a beacon via a plurality of sub-channels propagate;

FIG. 2 illustrates the temporal and frequency differences between signals transmitted by a beacon via three different sub-channels;

FIG. 3 is a block diagram of an apparatus that may be specifically configured in accordance with an example embodiment of the present disclosure;

FIG. 4 is a flowchart illustrating the operations performed, such as by the apparatus of FIG. 3, in accordance with an example embodiment of the present disclosure;

FIG. 5 is a graphical representation of the signal strength of signals previously transmitted via a plurality of sub-channels and the representation of a respective signal that is determined at least partially based on the past signal strength information in accordance with an example embodiment of the present disclosure;

FIG. 6 is a graphical representation of the signal strength of signals previously transmitted via a plurality of sub-channels and the representation of a respective signal that is determined at least partially based on the past signal strength information in accordance with another example embodiment of the present disclosure;

FIG. 7 is a graphical representation of the signal strength of signals previously transmitted via a plurality of sub-channels and the representation of a respective signal that is determined at least partially based on the past signal strength information in accordance with a further example embodiment of the present disclosure;

FIG. 8 is a graphical representation of the signal strength of signals previously transmitted via a plurality of sub-channels and the representation of a respective signal that is determined at least partially based on the past signal strength information in accordance with yet another example embodiment of the present disclosure;

FIG. 9 illustrates a space in which the received signal strength information collected at a respective location is associated with a respective sub-channel of the plurality of sub-channels via which a beacon transmits signals in accordance with an example embodiment of the present disclosure; and FIG. 10 is a flowchart illustrating the operations performed, such as by the apparatus of FIG. 3, in order to discriminate between signals transmitted on a plurality of sub-channels in conjunction with a positioning application in accordance with another example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to improve the positioning performance associated with a positioning application, thereby allowing the position of a mobile device to be determined more accurately. In order to improve the positioning performance, the method, apparatus and computer program product of an example embodiment may be configured to separately collect fingerprint information for signals transmitted by a beacon on each of a plurality of sub-channels by discriminating between the signals transmitted on each of the plurality of sub-channels. The fingerprint information may then be utilized to more accurately determine the position of a mobile device within a space for which the fingerprint information has been collected. Additionally or alternatively, the method, apparatus and computer product may improve the positioning performance by representing a signal transmitted by the beacon on a respective sub-channel with a value that is determined based on both a received radio signal propagation parameter, such as the received signal strength. of the signal and the received radio signal propagation parameter, e.g., received signal strength, of signals previously transmitted by the beacon on one or more of a plurality of sub-channels. The value with which the signal is represented may then be utilized for purposes of comparison with respect to fingerprint information that has been previously defined in association with the beacon in order to permit the position of the mobile device that received the signal to be determined with increased accuracy.

In conjunction with a positioning application, a source of radio signals, such as a beacon, is configured to transmit signals throughout a space. As shown in FIG. 1, the space 10 may be an indoor space, such as the space within a building. Alternatively, the space through which the signals transmitted by the access point propagate may be an outdoor space. Regardless of the type of space, the signal that is transmitted by a beacon 12 can be defined by one or more radio signal propagation parameters. For example, the signal transmitted by the beacon has a predefined signal strength upon transmission with the signal strength gradually diminishing as the signal propagates through the space. As this scenario exemplifies, the signal strength of a signal will be utilized to illustrate a radio signal propagation parameter, although additional or other radio signal propagation parameters may be utilized in other embodiments. In order to support a positioning application that may be utilized to determine the position of a mobile device 14 and, in turn, a person carrying the mobile device, fingerprint information is collected throughout at least a portion of the space through which the signals transmitted by the beacon propagate. The fingerprint information defines the received radio signal propagation parameter, such as the received signal strength, of the signals transmitted by the beacon at a particular location within the space. Following definition of the fingerprint information, the position of a mobile device within the space may be determined based upon a comparison of the received radio signal propagation parameter of signals transmitted by the beacon and received by the mobile device at a respective location within the space to the fingerprint information. In this regard, the position of the mobile device will be determined to be the location within the space at which the received radio signal propagation parameter of the signals received by the mobile device match the fingerprint information. For example, the position of the mobile device may be determined to be the position associated with fingerprint information having a received signal strength value that matches otherwise corresponds to the received signal strength of the signal received by the mobile device.

A positioning application of this type therefore generally includes two stages, a first stage in which the fingerprint information is collected and defined and a second stage in which the location of a mobile device 14 is determined based upon a comparison of the received radio signal propagation parameter of signals received by the mobile device to the fingerprint information. In some embodiments, the first stage in which the fingerprint information is defined is performed off-line, such as in a batch process, in which signals transmitted by a beacon 12 are collected over time by one or more mobile devices at a plurality of locations throughout the space 10 and are subsequently analyzed to define fingerprint information associating a received radio signal propagation parameter value, such as a received signal strength value, for signals transmitted by the beacon with a respective location within the space. In at least some embodiments, the second stage in which the position of a mobile device is determined in relation to the fingerprint information may be performed online or in real time or near real time such that the current position of the mobile device and, in turn, a person carrying the mobile device may be determined in relation to the fingerprint information as has been previously collected.

Although FIG. 1 depicts a single beacon 12 transmitting signals throughout the space 10, there may be a plurality of beacons transmitting signals throughout the space in other embodiments. The signals transmitted by a plurality of beacons may be distinguished based upon information provided by the signals that identifies the beacon that transmitted the signals. The beacon may be embodied by any of a variety of radio based transmitters configured to transmit wireless signals throughout a space, such as a transmitter of BLE signals, WiFi signals or the like. The beacon of an example embodiment may be an access point, e.g., a WiFi access point, a base station, a Node B, e.g., an evolved Node B (eNB) or the like. Regardless of the type of beacon, the beacon of an example embodiment is configured to transmit signals on a plurality of sub-channels. In this regard, each sub-channel may support the transmission of signals at a different frequency or within different frequency band. Although the beacon may include any number of sub-channels, such as two, three, four or more sub-channels, the beacon of one example embodiment transmits signals on three sub-channels. In this example embodiment, the beacon transmits signals via first, second third sub-channels at first, second and third, frequencies, respectively. The first, second and third frequencies are different from one another.

In some embodiments, the signals transmitted by a beacon 12 on a plurality of sub-channels are not only separated in frequency, but also temporally with the beacon transmitting signals on different sub-channels during different periods of time. As shown in FIG. 2, for example, the beacon may transmit signals on the first sub-channel at a first frequency $f_1$ during a first period of time $t_1$, followed by the transmission of signals on the second sub-channel at a second frequency $f_2$ during a second period of time $t_2$ and then the transmission of signals on the third sub-channel at a third frequency $f_3$ during a third period of time $t_3$. This sequential process of transmitting signals on the first, second and third sub-channels at different frequencies and during different periods of time may then be repeated.

In order to more accurately determine the position of a mobile device 14, the method, apparatus and computer program product of an example embodiment discriminate between the signals transmitted by a beacon 12 on a plurality of sub-channels. By taking into account the particular sub-channel on which a signal is transmitted by the beacon, a signal that is collected by a mobile device may be represented by a value that is based on, but different than the received radio signal propagation parameter, such as the received signal strength, and that may be compared to fingerprint information associated with the beacon to determine the position of the mobile device with more accuracy. In this regard, the method, apparatus and computer program product of an example embodiment may reduce the errors in the position of a mobile device that are attributable to the manner in which at least some prior positioning techniques failed to take into account the sub-channel on which a signal is transmitted. For example, the method, apparatus and computer program product may reduce the jumpiness in the position of a mobile device in an instance in which fingerprint information is based upon signals transmitted via one sub-channel and the radio signal propagation information utilized by a positioning application is based upon signals transmitted via a different sub-channel with the radio signal propagation information for the same location changing over time as the beacon transmits signals via different sub-channels.

Additionally, in some embodiments, fingerprint information can be separately collected for each sub-channel of the beacon 12 at each of a plurality of locations within a space 10. In these embodiments, the subsequent determination of the position of a mobile device 14, such as by a positioning application, can also take into account the sub-channel via which a signal was transmitted for purposes of comparison to the fingerprint information that also distinguishes between different sub-channels on which the signals are transmitted. As a result, the method, apparatus and computer program product of this example embodiment are configured to determine the position, such as in conjunction with a positioning application, with increased accuracy as a result of the discrimination between signals transmitted by different sub-channels of the beacon.

An apparatus 20 configured to improve the positioning performance associated with a positioning application, such as by discriminating between signals transmitted by a beacon 12 on a plurality of sub-channels, is depicted in FIG. 3. The apparatus may be embodied by any of a variety of computing devices including, for example, fixed computing devices, such as a server, a cloud computing device, a computer workstation, a distributed network of computing devices, a personal computer, a positioning or navigation system, a mapping system or any other type of fixed computing device, a mobile computing device, such as a mobile terminal, e.g., a personal digital assistant (PDA), mobile telephone, smart phone, personal navigation device, smart watch, tablet computer, or any combination of the aforementioned and other types of portable computer devices, or a positioning or navigation system such as a positioning or navigation system onboard a vehicle, e.g., an automobile, a truck, a drone, a train, etc., or any combination of fixed and/or mobile computing devices. Regardless of the manner in which the apparatus is embodied, the apparatus of an example embodiment includes processing circuitry 22, a memory device 24 and a communication interface 26.

In some embodiments, the processing circuitry 22 (and/or co-processors or any other processors assisting or otherwise associated with the processing circuitry) can be in communication with the memory device 24 via a bus for passing information among components of the apparatus 20. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory device 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26. The communication interface can be any means such as a device or circuitry embodied in either hardware or a combination of hardware and software that is configured to receive and/or transmit data from/to other electronic devices in communication with the apparatus, such as by receiving signals transmitted by a beacon via the plurality of sub-channels. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Referring now to FIG. 4, the operations performed, such as by the apparatus 20 of FIG. 3 in order to improve the positioning performance associated with a positioning application are depicted. As shown in block 30 of FIG. 4, the apparatus of an example embodiment includes means, such as the processing circuitry 22, the communication interface 26 or the like, for receiving particular radio signal propagation information regarding a received radio signal propagation parameter of a respective signal collected by a mobile device 14 following transmission by a beacon 12 on one of the plurality of sub-channels on which the beacon is configured to transmit signals. As noted above, the signal strength of a signal will be utilized as the radio signal propagation parameter, although additional or other radio signal propagation parameters may be utilized in other embodiments.

In one example embodiment, the apparatus 20 may be embodied by the mobile device 14 that is carried by a user throughout the space 10 in which the beacon 12 transmits the signals such that the mobile device and, more particularly, the apparatus embodied by the mobile device, such as the processing circuitry 22, the communication interface 26 or the like, receives the respective signal transmitted by the beacon on the sub-channel. In this example embodiment, the apparatus, such as the processing circuitry, the communications interface or the like, may be configured to receive the particular signal strength information by determining the particular signal strength information from the received signal strength of the respective signal that has been received by the mobile device. In this regard, the particular signal strength information may define the received signal strength of the respective signal, such as in terms of decibels per milliwatt (dBm).

In an alternative embodiment, the signal transmitted by the beacon 12 on one of the plurality of sub-channels may be received by a mobile device 14 and particular signal strength information regarding the respective signal may be provided to the apparatus 20, such as the processing circuitry 22, the communication interface 26 or the like, by the mobile device or another computing device that is configured to determine and/or store the particular signal strength information regarding the received signal strength of the respective signal transmitted by the beacon. In this alternative embodiment, the apparatus may be embodied by a different computing device than the mobile device that collects the respective signal transmitted via the sub-channel by the beacon. Thus, the apparatus, such as the processing circuitry, the communication interface or the like, of this example embodiment is configured to receive information regarding the received signal strength of the respective signal even though the apparatus did not receive the respective signal itself.

As shown in block 36 of FIG. 4, the apparatus 20 also includes means, such as the processing circuitry 22, the communication interface 26 or the like, for receiving past radio signal propagation information regarding the received radio signal propagation parameter of signals previously transmitted by the beacon 12 and collected by the mobile device 14 on one or more of the plurality of sub-channels. In an example embodiment, past signal strength information is received regarding the received signal strength of signals previously transmitted by the beacon and collected by the mobile device on each of the plurality of sub-channels. For a beacon configured to transmit signals via first, second and third sub-channels as shown in FIG. 2, past signal strength information may be received for signals transmitted via the first sub-channel, past signal strength information may be received for signals transmitted via the second sub-channel and past signal strength information may be received for signals transmitted via the third sub-channel.

The past signal strength information may include a variety of different types of information regarding the received signal strength of signals transmitted on a respective sub-channel. For example, the past signal strength information may define the received signal strength of signals transmitted on a respective sub-channel at different points in time or at least the received signal strength of the signals that have been most recently transmitted on the respective sub-channel. Additionally or alternatively, the past signal strength information may define one or more parameters that characterize the received signal strength of signals transmitted on a respective sub-channel, such as the mean of the received signal strength of signals transmitted on the respective sub-channel.

As shown in block 38 of FIG. 4, the apparatus 20 also includes means, such as the processing circuitry 22 or the like, for determining a value for representing the respective signal that was transmitted by the beacon 12 and collected by the mobile device 14. As described below in conjunction with a variety of different example embodiments, the apparatus, such as the processing circuitry, is configured to determine the value that represents the respective signal based on the particular signal strength information regarding the received signal strength of a respective signal and past signal strength information regarding the received signal strength of signals previously transmitted by the beacon and collected by the mobile device on one or more of the plurality of sub-channels, such as two or more of the plurality of sub-channels in some embodiments and each of the plurality of sub-channels in other embodiments. Although the value is partially based on the received signal strength of the respective signal, the value representing the respective signal is different from the received signal strength of the respective signal. As exemplified by the embodiments described below, the apparatus, such as the processing circuitry, may be configured to determine the value for representing the respective signal based on the particular signal strength information regarding the respective signal and past signal strength information regarding the received signal strength of signals previously transmitted by the beacon and collected by the mobile device on each of the sub-channels of the beacon, such as on all three of the sub-channels of a beacon that transmits signals via first, second and third sub-channels. The apparatus, such as the processing circuitry, may be configured to determine the value representing the respective signal in various manners as described below in conjunction with several alternative embodiments.

In order to determine the value for representing the respective signal based on the particular signal strength information regarding the respective signal and past signal strength information regarding the received signal strength of signals previously transmitted by the beacon 12 on one or more of the sub-channels of the beacon, at least some of the signals that have been previously transmitted by the beacon and collected by the mobile device 14 on the plurality of sub-channels must be classified depending upon the sub-channel on which the prior signals were transmitted by the beacon. Thus, the apparatus 20, such as the processing circuitry 22, of an example embodiment is configured to determine the sub-channel on which a respective signal was transmitted as shown in block 32 of FIG. 4, such as by distinguishing a signal previously transmitted by the beacon on one of the sub-channels from signals previously transmitted by the same beacon on other ones of the sub-channel. As a result, the apparatus of this example embodiment also includes means, such as the processing circuitry or the like, for classifying the particular signal strength information regarding the received signal based on the sub-channel on which the respective signal was transmitted. See block 34 of FIG. 4. The apparatus, such as the processing circuitry, may be configured to classify the particular signal strength information regarding the received signal strength of the respective signal in various manners. In an example embodiment, however, the apparatus, such as the processing circuitry, is configured to implement a machine learning algorithm and, more particularly, a classification method, such as a data association method and, in one embodiment, a data association method that is suitable for real-time or near real-time, time series data analysis, such as a Mixture of Gaussian processes model, in order to evaluate the signals, including the respective signal, transmitted by the beacon and collected by the mobile device and, more particularly, to evaluate the received signal strength of the signals, including the respective signal, transmitted by the beacon and collected by the mobile device in order to classify the respective signal and, in turn, the particular signal strength information regarding the received signal strength of the respective signal based on the sub-channel on which the respective signal was transmitted.

As shown, for example, in FIG. 5, the received signal strength of a plurality of signals that have been previously transmitted by the beacon 12 and collected by the mobile device 14 at different points in time are depicted by circles. In this embodiment, the apparatus 20, such as the processing circuitry 22, is configured to implement a Mixture of Gaussian Processes classification model and, as a result, have classified the circles connected by line 50 as being signals transmitted on a first sub-channel by the beacon, the circles connected by line 52 as being signals transmitted on a second sub-channel by the beacon and the circles connected by line 54 as being signals transmitted on a third sub-channel by the beacon.

As shown in block 40 of FIG. 4, the apparatus 20 also includes means, such as the processing circuitry 22 operating in conjunction with the positioning application, for representing the respective signal has been transmitted by a beacon 12 and received by the mobile device 14 with the value that is determined based on the particular radio signal propagation information and the past radio signal propagation information, e.g., the particular signal strength information and the past signal strength information. As noted above, although the value represents the respective signal, the value is different than the received signal strength of the respective signal. In this regard, the apparatus, such as the processing circuitry, is configured to represent the respective signal with a value that is based on the information regarding the received signal strength of signals previously transmitted by the beacon and collected by the mobile device on one or more of the plurality of sub-channels and, as exemplified by the embodiments discussed below, by two or more of the plurality of sub-channels. In this regard, the apparatus, such as the processing circuitry, may be configured to represent the respective signal with a value that is determined based not only on the particular signal strength information regarding the received signal strength of the respective signal, but also the past signal strength information regarding the received signal strength of signals previously transmitted on each of the plurality of sub-channels, such as the first, second and third sub-channels of a beacon that transmits signals via three different sub-channels. As noted above, the manner in which the apparatus, such as the processing circuitry, is configured to determine the value with which to represent the respective signal may be performed in a variety of different manners with the resulting value that represents the respective signal being different than the received signal strength.

By way of example with reference to FIG. 5, the apparatus 20, such as the processing circuitry 22, of an example embodiment is configured to represent the respective signal with a value different than the received signal strength by representing the respective signal with the mean of at least some of the signals that have been previously transmitted by the beacon 12 and collected by the mobile device 14 on a respective sub-channel, such as the mean of the sub-channel that is closest in terms of received signal strength to the received signal strength of the respective signal that is transmitted by the beacon and collected by the mobile device. In this regard, after the signals that have been previously transmitted by the beacon on respective sub-channels of the plurality of sub-channels have been classified based upon the sub-channel on which each signal was transmitted, the apparatus, such as the processing circuitry, may be configured to determine the mean of at least some of the signals that have been transmitted by the beacon on a respective sub-channel, such as the signals that have been most recently transmitted by the beacon on the respective sub-channel. For example, the apparatus, such as the processing circuitry, may be configured to determine the mean of a predetermined number of the signals that have most recently been transmitted by the beacon on the respective sub-channel or the mean of the signals that have been transmitted by the beacon on the respective sub-channel within a most recent predefined period. As such, for a beacon that transmits signals via three sub-channels, the apparatus, such as the processing circuitry, of an example embodiment is configured to determine the mean of the signals classified as being transmitted on the first sub-channel, such as represented by dashed line 56 of FIG. 5, the mean of the signals classified as being transmitted on the second sub-channel, such as represented by dashed line 58 of FIG. 5 and the mean of the signals classified as being transmitted on the third sub-channel, such as represented by dashed line 60 of FIG. 5.

In this example embodiment, the apparatus 20, such as the processing circuitry 22, is configured to represent the respective signal that has been transmitted by the beacon 12 and collected by the mobile device 14 with a value that is equal to the mean of the received signal strength of the signals previously transmitted on a respective sub-channel that is closest to the received signal strength of the respective signal from among the means of the received signal strength of the signals transmitted on the various sub-channels. With reference to FIG. 5, for example, a respective signal that is transmitted by the beacon and collected by the mobile device and determined to have a received signal strength indicated by the X 61 will be represented in this example embodiment by a value equal to the mean of the received signal strength of the signals transmitted second sub-channel as represented by dashed line 58 since the mean associated with the second sub-channel is closest to the received signal strength of the respective signal transmitted by the beacon and collected by the mobile device from among the means of the received signal strength of the signals transmitted by the beacon on the three different sub-channels. Thus, instead of the received signal strength being represented by the value designated X in FIG. 5, the respective signal transmitted by the beacon and collected by the mobile device will be represented by a value equal to the mean of the second sub-channel as indicated by dashed line 58.

While one example is provided in FIG. 5, the apparatus 20, such as the processing circuitry 22, may be configured to represent the respective signal that is transmitted by the beacon 12 and collected by the mobile device 14 with a value that is differently defined in other embodiments based on the particular signal strength information regarding the received signal strength of the respective signal and the past signal strength information regarding the received signal strength of signals previously transmitted by the beacon and collected by the mobile device on one or more of the plurality of sub-channels, such as two or more of the sub-channels. For example, the apparatus, such as the processing circuitry, of another example embodiment is configured to represent the respective signal with a value that is based upon a combination of the received signal strength of the respective signal and a representation of the received signal strengths of at least some of the signals that have been previously transmitted by the beacon and collected by the mobile device on one or more of the other sub-channels, different than the sub-channel on which the respective signal is transmitted.

With reference to FIG. 6, for example, upon receipt of the particular signal strength information regarding the received signal strength of a respective signal collected by the mobile device 14, the apparatus 20, such as the processing circuitry 22, is configured to classify the respective signal based upon the sub-channel on which the respective signal was transmitted by the beacon 12. As described above, the apparatus, such as the processing circuitry, may be configured to implement any of a variety of different classification techniques including the Mixture of Gaussian Processes model in order to determine the sub-channel on which the respective signal was transmitted. The apparatus, such as the processing circuitry, of this example embodiment is then configured to represent the respective signal with a value that is based upon a combination of the received signal strength of the respective signal and a representation of the received signal strength of at least some of the signals that have been previously transmitted by the beacon and collected by the mobile device on one or more of the other sub-channels. For example, the combination may be the average of the received signal strength of the respective signal and the means of the received signal strengths of the signals transmitted by the beacon and collected by the mobile device on the other sub-channels, different than the sub-channel on which the respective signal was transmitted. With more particular reference to FIG. 6, the apparatus, such as the processing circuitry, may be configured to represent the respective signal with a value that is the average of the received signal strength of the respective signal that has been classified as shown by line 52 as having been transmitted on the second sub-channel as well as the means of the received signal strength of the signals that have been previously transmitted by the beacon on the first and third sub-channels, as represented by the dashed lines 56 and 60, respectively.

In another example embodiment depicted in FIG. 7, the apparatus 20, such as the processing circuitry 22, is configured to differently represent a respective signal with a value that is based upon the combination of the received signal strength of the respective signal has been transmitted by the beacon 12 and collected by the mobile device 14 as well as representations of the received signal strength of at least some of the signals that have been previously transmitted by the beacon and collected by the mobile device on one or more of the other sub-channels. In this regard, the apparatus, such as the processing circuitry, may again be configured to classify the respective signal that has been transmitted by the beacon and collected by the mobile device depending upon the sub-channel on which the respective signal was transmitted. In addition, the apparatus, such as the processing circuitry, of this example embodiment is configured to predict an anticipated value of the received signal strength of a signal that would have been:
(i) transmitted by the beacon on another sub-channel, different than the sub-channel on which the respective signal is transmitted, and (ii) collected by the mobile device contemporaneously with the collection by the mobile device of the respective signal at time to. As shown by line 52 of FIG. 7, for example, the respective signal is classified as having been transmitted on the second sub-channel. Based upon the signals that have been previously classified to have been transmitted on the other sub-channels, that is, the first and third sub-channels, the apparatus, such as the processing circuitry, is configured to determine an anticipated value 62 of the received signal strength of a signal that would have been transmitted by the beacon on the first sub-channel and collected by the mobile device at the same time that the respective signal was being collected from the second sub-channel as well as to determine an anticipated value 64 of the received signal strength of a signal that would have been transmitted by the beacon on the third sub-channel and collected by the mobile device at the same time that the respective signal was being collected from the second sub-channel.

The apparatus 20 of this example embodiment also includes means, such as the processing circuitry 22, for representing the respective signal with a value that is determined based upon the combination of the received radio signal propagation parameter, such as the received signal strength, of the respective signal and the anticipated value(s) of signals that would have been transmitted by the beacon 12 and collected by the mobile device 14 at the same time on the other sub-channels. With reference to the example embodiment of FIG. 7, the apparatus, such as the processing circuitry, of an example embodiment is configured to determine the value with which to represent the respective signal based upon an average of the received signal strength of the respective signal and the anticipated values 62, 64 of the received signal strengths of signals that would have been transmitted by the beacon on the first and third sub-channels and collected by the mobile device contemporaneously with the collection by the mobile device of the respective signal.

As an alternative to representing the received signal strengths of signals that have been previously transmitted by the beacon 12 and collected by the mobile device 14 on one or more of the other sub-channels based upon anticipated value(s) of the received signal strength of signals that would have been transmitted on the other sub-channels and collected contemporaneously with the respective signal, the received signal strengths of the signals previously transmitted by the beacon and collected by the mobile device on one or more other sub-channels may be represented by the received signal strengths of the signals that have been collected by the mobile device most recently on the one or more other channels. In this regard, the apparatus 20, such as the processing circuitry 22, may be configured to represent the respective signal that was transmitted by the beacon on one of the sub-channels and collected by the mobile device with a value that is based upon a combination of the received signal strength of the respective signal and the received signal strengths of signals that have been previously transmitted by the beacon and collected by the mobile on one or more of the other sub-channels, different than the sub-channel on which the respective signal was transmitted. In this regard, the combination includes the received signal strengths of signals most recently transmitted by the beacon and collected by the mobile device on one or more of the other sub-channels relative to the time at which the respective signal was collected by the mobile device.

By way of example with respect to FIG. 8, a respective signal may be transmitted by the beacon 12 on a second sub-channel and collected by the mobile device 14 at time to. In order to represent the respective signal with a value determined in accordance with this example embodiment, the apparatus 20, such as the processing circuitry 22, is configured to combine the received signal strength of the respective signal that was transmitted via the second sub-channel and collected by the mobile device at time $t_o$ and the received signal strengths of signals that were previously transmitted by the beacon on the first and third sub-channels and collected by the mobile device prior to, but most recently relative to the time to at which the respective signal was collected by the mobile device from the second sub-channel. See the signals designated as 66 and 68 on the first and third sub-channels, respectively. In this regard, the received signal strengths of any number of signals transmitted by the beacon on the first and third sub-channels and collected by the mobile device prior to the time to at which the respective signal was collected by the mobile device on the second sub-channel may be utilized, such as the received signal strength of a single signal from each of the first and third sub-channels (designated 66 and 68, respectively, in FIG. 8) or the received signal strengths of a plurality of the most recent signals received via the first and third sub-channels. In an instance in which the received signal strengths of a plurality of signals that have been recently received on the other sub-channels, such as the first and third sub-channels, are to be utilized to determine the value representing the respective signal, the apparatus, such as the processing circuitry, may be configured to determine the mean of the received signal strengths of the recently received signals on the first sub-channel and the mean of the received signal strengths of the recently received signals on the third sub-channel. The apparatus, such as processing circuitry, of this example embodiment is then configured to determine the value representing the respective signal collected by the mobile device at time to from the second sub-channel based upon a combination, such as the mean, of the respective signal collected at time to from the second sub-channel and the representation of the received signal strength of the signals that have been recently received signals on the other sub-channels, that is, the first and third sub-channels, such as the received signal strength of a single most recently received signal on each of the first sub-channel and the third sub-channel or the mean of the received signal strengths of a plurality of the most recently received signals on the first sub-channel and the third sub-channel.

The foregoing techniques for determining the value for representing a respective signal transmitted by a beacon 12 on a sub-channel and collected by the mobile device 14 may be employed either in conjunction with the initial phase of defining fingerprint information for a plurality of locations throughout a space 10 or for the subsequent phase in which the position of a mobile device that has collected the respective signal is determined, such as by utilizing a positioning application that compares the value representing the respective signal to fingerprint information that has been previously defined for various locations throughout a space. In this regard, the apparatus 20 of an example embodiment may also include means, such as the processing circuitry 22 or the like, for determining the position of the mobile device that has received the respective signal on one of the sub-channels based upon a comparison of the value representing the respective signal to information, such as a fingerprint map, regarding the received radio signal propagation expectation, such as the received signal strength expectation, that is anticipated to be received from the beacon at each of a plurality of locations throughout a space. See block 42 of FIG. 4. In this regard, the information regarding the received signal strength expectation may be defined, in one example embodiment, by fingerprint information associated with each of a plurality of locations throughout the space.

By representing the respective signal with a value that is based not only on the received signal strength of the signal, but also on the received signal strength of signals previously transmitted by the beacon 12 and collected by the mobile device 14 on other sub-channels of the beacon, the method, apparatus 20 and computer program product may improve the accuracy with respect to which the position of the mobile device may be determined, such as by a positioning application. In this regard, errors or other inaccurate or disconcerting changes, e.g., jumps, in the position determined for a mobile device may be reduced by separately taking into account the received radio signal propagation parameter, such as the received signal strength, of signals received via each of a plurality of sub-channels over which the beacon transmits signals, thereby allowing a positioning application to provide more accurate position determination of a mobile device.

By way of example, the following table provides the mean positioning error and the maximum positioning error for twelve trials conducted both in accordance with a prior technique that does not consider the sub-bands via which signals are transmitted and in accordance with the embodiment described above in conjunction with FIG. 6. All values are in terms of meters. As shown, the embodiment of FIG. 6 reduces the maximum positioning error by about 0.5 meters, thereby improving the positioning performance.

|   | Prior Implementation | | FIG. 6 Embodiment | |
|---|---|---|---|---|
|   | mean error | max error | mean error | max error |
| 1 | 2.673325218 | 5.75060939 | 2.68022685 | 5.88830456 |
| 2 | 6.165459389 | 19.7964558 | 6.11848555 | 19.7964558 |
| 3 | 4.568339714 | 11.4542635 | 4.56833971 | 11.4542635 |
| 4 | 4.844881694 | 8.10023158 | 4.96652112 | 7.8910958 |

-continued

| | Prior Implementation | | FIG. 6 Embodiment | |
|---|---|---|---|---|
| | mean error | max error | mean error | max error |
| 5 | 6.514722992 | 19.3632098 | 6.15786501 | 10.6172721 |
| 6 | 3.389980886 | 7.16824186 | 2.7494667 | 7.16790892 |
| 7 | 3.300468318 | 6.5385021 | 2.83085544 | 6.45056373 |
| 8 | 3.472487251 | 8.52651756 | 3.11729009 | 8.52651756 |
| 9 | 4.878530401 | 13.7414207 | 5.91737374 | 15.1271333 |
| 10 | 6.350834319 | 17.9883353 | 5.44898983 | 15.5717202 |
| 11 | 3.562177566 | 7.19656642 | 5.20660352 | 10.1361733 |
| 12 | 4.651843104 | 11.969361 | 6.26902916 | 11.9142299 |
| average | 4.531087571 | 11.4661429 | 4.66925389 | 10.8784699 |

As another example, the following table provides the mean positioning error and the maximum positioning error for twelve trials conducted both in accordance with a prior technique that does not consider the sub-bands via which signals are transmitted and in accordance with the embodiment described above in conjunction with FIG. 8. All values are in terms of meters. As shown, both the mean positioning error and the maximum positioning error improve in accordance with the embodiment of FIG. 8 with the maximum positioning error being reduced by about 0.5 meters, thereby also improving the positioning performance.

| | Prior Implementation | | FIG. 8 Embodiment | |
|---|---|---|---|---|
| | mean error | max error | mean error | max error |
| 1 | 2.673325218 | 5.75060939 | 2.623656532 | 5.75060939 |
| 2 | 6.165459389 | 19.7964558 | 6.080973507 | 19.7964558 |
| 3 | 4.568339714 | 11.4542635 | 4.568339714 | 11.4542635 |
| 4 | 4.844881694 | 8.10023158 | 5.037039526 | 7.95732822 |
| 5 | 6.514722992 | 19.3632098 | 6.38429762 | 10.1710282 |
| 6 | 3.389980886 | 7.16824186 | 2.847696601 | 7.1635658 |
| 7 | 3.300468318 | 6.5385021 | 2.828628212 | 6.47258543 |
| 8 | 3.472487251 | 8.52651756 | 3.375398806 | 8.52651756 |
| 9 | 4.878530401 | 13.7414207 | 6.062779275 | 15.7949897 |
| 10 | 6.350834319 | 17.9883353 | 5.679554949 | 18.5281095 |
| 11 | 3.562177566 | 7.19656642 | 3.627474381 | 7.96033158 |
| 12 | 4.651843104 | 11.969361 | 4.907541501 | 9.94902084 |
| average | 4.531087571 | 11.4661429 | 4.501948385 | 10.7937338 |

In another example embodiment, the method, apparatus 20 and computer program product are configured to define the fingerprint information so as to have a separate value, such as a value representative of the received radio signal propagation parameter, such as the received signal strength, for each of the plurality of sub-channels via which a beacon 12 transmits radio signals, at each of a plurality of locations throughout a space 10. By way of example in which the beacon transmits signals via three sub-channels, the fingerprint information for a first location within the space may include first, second and third values representative of the received signal strength expectation for signals transmitted by the beacon via the first, second and third sub-channels, respectively, and received by a mobile device at the location. Fingerprint information having distinct values for the received signal strength expectation that is anticipated to be received from the beacon via the different sub-channels may be defined for each of a plurality of other locations throughout the space.

The apparatus 20 of this example embodiment may include means, such as the processing circuitry 22 or the like, for associating the representation of the received radio signal propagation parameter, such as the received signal strength, of the signals transmitted by the beacon 12 on a respective sub-channel with an indication of the respective sub-channel of the beacon. The plurality of different values defining the received signal strength expectation for signals transmitted via the different sub-channels and received by mobile device 14 at a location may be associated with an indication of the respective sub-channel of the beacon in various manners. For example, in an embodiment in which the beacon is identified by an address, such as a media access control (MAC) address, the apparatus, such as the processing circuitry, may be configured to associate the value defining the received signal strength expectation for signals transmitted by one sub-channel with the address, such as the MAC address, of the beacon at the particular location. In this example, the apparatus, such as the processing circuitry, may also be configured to create one or more virtual addresses based upon the address of the beacon with the virtual addresses associated with the other respective sub-channels of the beacon. The apparatus, such as the processing circuitry, is then configured to associate the other values representative of the received signal strength expectations for signals transmitted via other sub-channels and received by the mobile device at the same location with virtual addresses, such as modified versions of the same MAC address, of the beacon. In this regard, the address may be modified in various manners, but, in one example embodiment is modified with different prefixes or suffixes added to the address to uniquely identify the received signal strength expectations for signals transmitted via the other sub-channels. See, for example, FIG. 9 in which the received signal strength expectations for signals transmitted via each of three sub-channels are depicted at each of two different locations within a space 10. In the illustrated embodiment, the received signal strength expectation for signals transmitted via the first sub-channel is designated by the MAC address of the beacon, e.g., 2c671969c9e3, while the received signal strength expectations for signals transmitted via the second and third sub-channels are designated by adding prefixes of A and B, respectively, to the MAC address of the beacon, e.g., A2c671969c9e3 and B2c671969c9e3.

As shown in block 70 of FIG. 10, the apparatus 20 of an example embodiment includes means, such as the processing circuitry 22, the communication interface 26 or the like, for receiving radio signal propagation information regarding a received radio signal propagation parameter, such as signal strength information regarding a received signal strength, of signals collected by a mobile device 14 following transmission by a beacon 12 on the plurality of sub-channels. As described above, the apparatus may be embodied by the mobile device that is carried by a user throughout the space 10 in which the beacon transmits the signals such that the mobile device and, more particularly, the apparatus embodied by the mobile device, such as the processing circuitry, the communication interface or the like, receives the respective signal transmitted by the beacon on the sub-channel. In this example embodiment, the apparatus, such as the processing circuitry, the communications interface or the like, may be configured to receive the particular signal strength information by determining the particular signal strength information from the received signal strength of the respective signal that has been received by the mobile device. Alternatively, the signal transmitted by the beacon on one of the plurality of sub-channels may be received by a mobile device and particular signal strength information regarding the respective signal may be provided to the apparatus, such as the processing circuitry, the communication interface or the like, by the mobile device or another computing device that is configured to determine and/or store the particular signal strength information regarding the received signal strength of the respective signal transmitted by the beacon. In this alternative embodiment, the apparatus may be embodied by a different computing device than the mobile device that collects the respective signal transmitted via the sub-channel by the beacon. Thus, the apparatus, such as the processing circuitry, the communication interface or the like, of this example embodiment is configured to receive information regarding the received signal strength of the respective signal even though the apparatus did not receive the respective signal itself.

In order to define different values, such as different received signal strength expectations, for the signals anticipated be received at a respective location via different sub-channels of a beacon 12, the signals received by a mobile device 14 at the respective location must be distinguished based upon the sub-channel via which the signals are transmitted. As shown in block 72, the apparatus 20 of this example embodiment therefore also includes means, such as the processing circuitry 22, for classifying the radio signal propagation information regarding the received radio signal propagation parameter, such as the signal strength information regarding the received signal strength, of the signals based on the sub-channel on which a signal was transmitted. Once the radio signal propagation information, such as the signal strength information, has been classified based upon the sub-channel on which the signal was transmitted, separately for each of the plurality of sub-channels, the apparatus also includes means, such as the processing circuitry or the like, for defining a representation of the received radio signal propagation parameter, such as the received signal strength, of the signals transmitted by the beacon on a respective sub-channel based on the classification of the radio signal propagation information, such as the signal strength information, in relation to the respective sub-channel. See block 74. The received signal strength of the signals transmitted by a beacon on a respective sub-channel may be represented in various manners, such as by the average of the received signal strengths or by a value determined as described above in relation to FIG. 4.

Although the signals received by a mobile device 14 at a respective location may be classified based upon the sub-channel via which the signal was transmitted in various manners, the apparatus 20 of an example embodiment, such as the processing circuitry 22, the communication interface 26 or the like, is configured to receive a batch of radio signal propagation parameter information, such as signal strength information, regarding a plurality of signals collected over time by the mobile device that have been transmitted by the beacon 12 over the plurality of sub-channels. The apparatus, such as the processing circuitry, of this example embodiment is configured to implement a machine learning algorithm and, more particularly, a classification technique, such as an Expectation Maximization technique, to distinguish between and to separately classify the signals received by the mobile device that have been transmitted via different sub-channels and to define the representation of the received radio signal propagation parameter, such as the received signal strength, such as a received signal strength expectation, e.g., an average value of the received signal strength of signals received by the mobile device, at a respective location following transmission by the beacon over a respective sub-channel. By processing the information regarding the received radio signal propagation parameter of signals transmitted by the beacon and collected by a mobile device at a respective location as a batch, the apparatus, such as the processing circuitry, need not necessarily employ real-time, time series data analysis, but can, instead, utilize a classification technique, such as the Expectation Maximization technique, to accurately determine the radio signal propagation information at a respective location for each of the different sub-channels.

In this embodiment in which fingerprint information, such as information regarding the received radio signal propagation information, such as the received signal strength expectation, that is anticipated to be received from the beacon 12 at the respective location, is separately defined for each sub-channel, the apparatus 20, such as the processing circuitry 22, may thereafter be configured to determine the position of a mobile device 14 based upon a comparison of the value representative of the respective signal collected by the mobile device following transmission by the beacon on one of the plurality of sub-channels to the received radio signal propagation expectation, such as the received signal strength expectation, that is anticipated to be received from the beacon at each of a plurality of locations within the space 10 via each of the sub-channels, such as the received radio signal propagation expectations, such as the received signal strength expectations, on the three sub-channels of FIG. 9. In this regard, the location of the mobile device may be determined by the apparatus, such as the processing circuitry, to be that location at which the value representative of the respective signal captured by the mobile device most closely matches the received signal strength expectation of signals that were transmitted by the beacon via a respective sub-channel. As such, the apparatus, method and computer program product of this example embodiment may also provide for more accurate positioning of a mobile device by separately considering the received radio signal propagation parameter of the signal transmitted by each of the sub-channels over which a beacon transmits signals. Indeed, disconcerting jumps in position may be reduced or eliminated by considering the sub-channel via which a signal was transmitted both in conjunction with the collection of fingerprint information and also in conjunction with the determination of the position of a mobile device.

As described above, FIGS. 4 and 10 are flowcharts of an apparatus 20, method, and computer program product configured to improve the positioning performance of a positioning application according to an example embodiment. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the blocks of FIG. 4 with dashed outlines which are performed in some, but not all embodiments. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for improving positioning performance associated with a positioning application, the method comprising:
   receiving particular radio signal propagation information regarding a received radio signal propagation parameter of a respective signal collected by a mobile device following transmission by a beacon on one of a plurality of sub-channels;
   receiving past radio signal propagation information regarding the received radio signal propagation parameter of signals previously transmitted by the beacon and collected by the mobile device on one or more of the plurality of sub-channels;
   based on the particular radio signal propagation information and the past radio signal propagation information, determining, by processing circuitry, a value for representing the respective signal that is different from the received radio signal propagation parameter of the respective signal; and
   representing, by the processing circuitry in conjunction with the positioning application, the respective signal with the value determined based on the particular radio signal propagation information and the past radio signal propagation information.

2. The method of claim 1, further comprising determining a position of the mobile device based upon a comparison of the value representative of the respective signal to information regarding a received radio signal propagation expectation that is anticipated to be received from the beacon at each of a plurality of locations.

3. The method of claim 1, further comprising:
   determining the sub-channel on which the respective signal was transmitted; and
   classifying the particular radio signal propagation information regarding the received radio signal propagation parameter of the respective signal based on the sub-channel on which the respective signal was transmitted.

4. The method of claim 1, wherein representing the respective signal with the value comprises representing the respective signal with a mean of the radio signal propagation parameter of at least some of the signals that have been previously transmitted by the beacon and collected by the mobile device on the same sub-channel as the sub-channel on which the respective signal was transmitted.

5. The method of claim 1, wherein representing the respective signal with the value comprises representing the respective signal based upon a combination of the received radio signal propagation parameter of the respective signal and a representation of the received radio signal propagation parameters of at least some of the signals that have been previously transmitted by the beacon and collected by the mobile device on one or more of the other sub-channels, different than the sub-channel on which the respective signal was transmitted.

6. The method of claim 5, wherein representing the respective signal based upon the combination comprises representing the respective signal based upon the combination of the received radio signal propagation parameter of the respective signal and a mean of the received radio signal propagation parameters of at least some of the signals that have been previously transmitted by the beacon and collected by the mobile device on one or more of the other sub-channels, different than the sub-channel on which the respective signal was transmitted.

7. The method of claim 5, wherein representing the respective signal based upon the combination comprises:
   predicting an anticipated value of the received radio signal propagation parameter of a signal that would have been: (i) transmitted by the beacon on another sub-channel, different than the sub-channel on which the respective signal was transmitted and (ii) collected by the mobile device contemporaneously with collection by the mobile device of the respective signal; and
   representing the respective signal based upon the combination of the received radio signal propagation parameter of the respective signal and the anticipated value.

8. The method of claim 5, wherein representing the respective signal based upon the combination comprises representing the respective signal based upon the combination of the received radio signal propagation parameter of the respective signal and the received radio signal propagation parameters of signals that have been previously transmitted by the beacon and collected by the mobile device on one or more of the other sub-channels, different than the sub-channel on which the respective signal was transmitted, most recently relative to a time at which the respective signal was collected by the mobile device.

9. An apparatus configured to improve positioning performance associated with a positioning application, the apparatus comprising processing circuitry and at least one memory including computer program code instructions, the computer program code instructions configured to, when executed by the processing circuitry, cause the apparatus to:
receive particular radio signal propagation information regarding a received radio signal propagation parameter of a respective signal collected by a mobile device following transmission by a beacon on one of a plurality of sub-channels;
receive past radio signal propagation information regarding the received radio signal propagation parameter of signals previously transmitted by the beacon and collected by the mobile device on one or more of the plurality of sub-channels;
based on the particular radio signal propagation information and the past radio signal propagation information, determine a value for representing the respective signal that is different from the received radio signal propagation parameter of the respective signal; and
represent, in conjunction with the positioning application, the respective signal with the value determined based on the particular radio signal propagation information and the past radio signal propagation information.

10. The apparatus of claim 9, wherein the computer program code instructions are further configured to, when executed by the processing circuitry, cause the apparatus to determine a position of the mobile device based upon a comparison of the value representative of the respective signal to information regarding a received radio signal propagation expectation that is anticipated to be received from the beacon at each of a plurality of locations.

11. The apparatus of claim 9, wherein the computer program code instructions are further configured to, when executed by the processing circuitry, cause the apparatus to:
determine the sub-channel on which the respective signal was transmitted; and
classify the particular radio signal propagation information regarding the received radio signal propagation parameter of the respective signal based on the sub-channel on which the respective signal was transmitted.

12. The apparatus of claim 9, wherein the computer program code instructions are configured to, when executed by the processing circuitry, cause the apparatus to represent the respective signal with the value by representing the respective signal with a mean of the radio signal propagation parameter of at least some of the signals that have been previously transmitted by the beacon and collected by the mobile device on the same sub-channel as the sub-channel on which the respective signal was transmitted.

13. The apparatus of claim 9, wherein the computer program code instructions are configured to, when executed by the processing circuitry, cause the apparatus to represent the respective signal with the value by representing the respective signal based upon a combination of the received radio signal propagation parameter of the respective signal and a representation of the received radio signal propagation parameters of at least some of the signals that have been previously transmitted by the beacon and collected by the mobile device on one or more of the other sub-channels, different than the sub-channel on which the respective signal was transmitted.

14. The apparatus of claim 13, wherein the computer program code instructions are configured to, when executed by the processing circuitry, cause the apparatus to represent the respective signal based upon the combination by representing the respective signal based upon the combination of the received radio signal propagation parameter of the respective signal and a mean of the received radio signal propagation parameters of at least some of the signals that have been previously transmitted by the beacon and collected by the mobile device on one or more of the other sub-channels, different than the sub-channel on which the respective signal was transmitted.

15. The apparatus of claim 13, wherein the computer program code instructions are configured to, when executed by the processing circuitry, cause the apparatus to represent the respective signal based upon the combination by:
predicting a predicted value of the received radio signal propagation parameter of a signal that would have been: (i) transmitted by the beacon on another sub-channel, different than the sub-channel on which the respective signal was transmitted and (ii) collected by the mobile device contemporaneously with collection by the mobile device of the respective signal; and
representing the respective signal based upon the combination of the received radio signal propagation parameter of the respective signal and the predicted value.

16. The apparatus of claim 13, wherein the computer program code instructions are configured to, when executed by the processing circuitry, cause the apparatus to represent the respective signal based upon the combination by representing the respective signal based upon the combination of the received radio signal propagation parameter of the respective signal and the received radio signal propagation parameters of signals that have been previously transmitted by the beacon and collected by the mobile device on one or more of the other sub-channels, different than the sub-channel on which the respective signal was transmitted, most recently relative to a time at which the respective signal was collected by the mobile device.

17. A method for discriminating between signals transmitted on a plurality of sub-channels in conjunction with a positioning application, the method comprising:
receiving radio signal propagation information regarding received radio signal propagation parameters of signals collected by a mobile device following transmission by a beacon on the plurality of sub-channels;
classifying, with processing circuitry, the radio signal propagation information regarding the received radio signal propagation parameters of the signals based on the sub-channel on which a signal was transmitted; and
in conjunction with the positioning application and separately for each of the plurality of sub-channels, defining, with the processing circuitry, a representation of the received radio signal propagation parameter of the signals transmitted by the beacon on a respective sub-channel based on classification of the radio signal propagation information in relation to the respective sub-channel.

18. The method according to claim 17, further comprising associating the representation of the received radio signal propagation parameter of the signals transmitted by the beacon on the respective sub-channel with an indication of the respective sub-channel of the beacon.

19. The method according to claim 18, wherein the beacon is associated with an address, and wherein the method further comprises creating one or more virtual addresses based upon the address and associated with respective sub-channels of the beacon.

20. The method according to claim 17, wherein classifying the radio signal propagation information regarding the received radio signal propagation parameter of the signals comprises classifying the radio signal propagation information regarding the received radio signal propagation parameter of a batch of signals that have been transmitted by the beacon and collected by the mobile device over time.

* * * * *